Jan. 5, 1937.  A. LIMBACH  2,066,534
HOLDER FOR COSMETICS OR THE LIKE
Filed Aug. 28, 1934
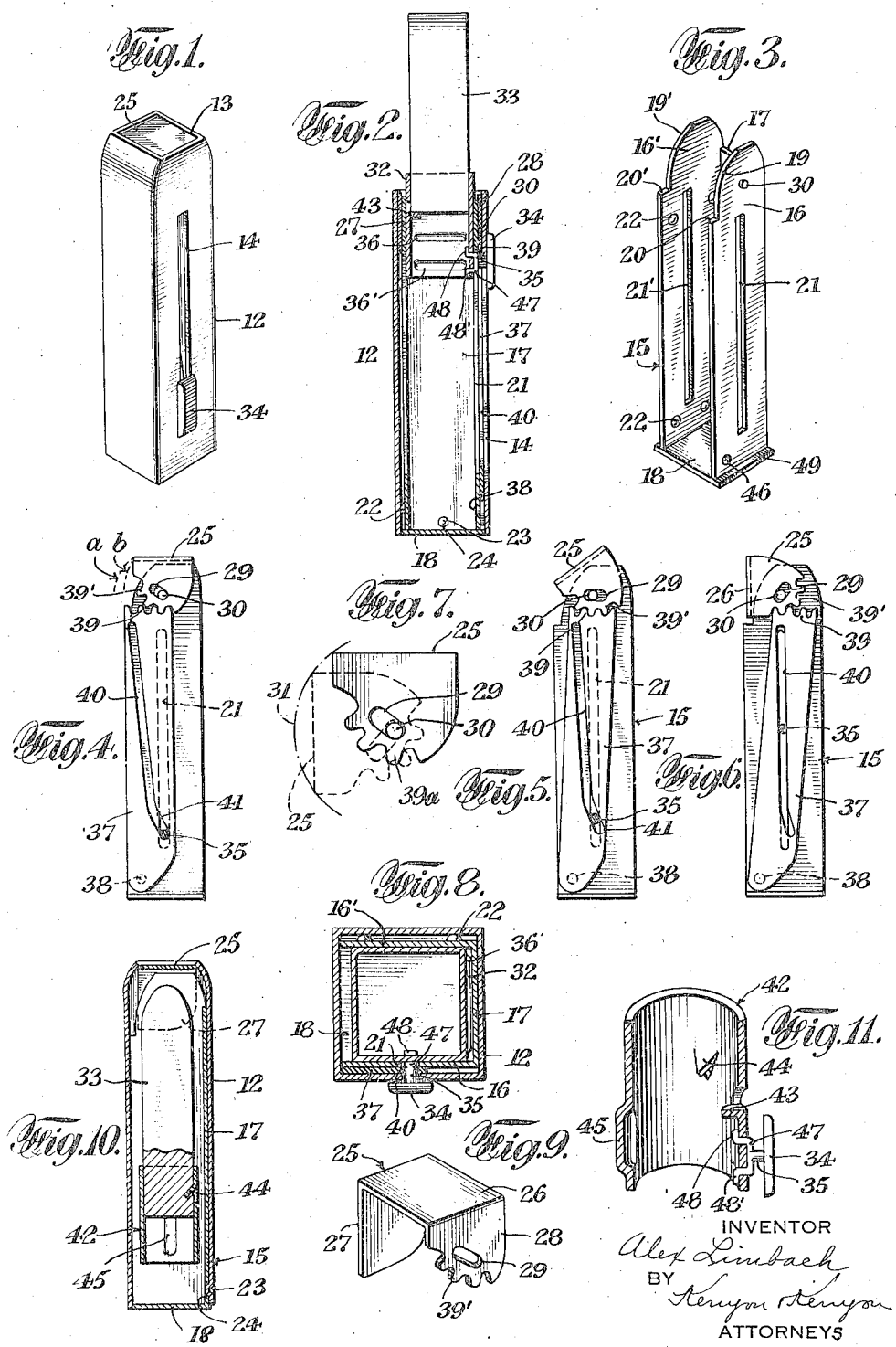
INVENTOR
Alex Limbach
BY
Kenyon & Kenyon
ATTORNEYS Patented Jan. 5, 1937

2,066,534

UNITED STATES PATENT OFFICE 2,066,534

HOLDER FOR COSMETICS OR THE LIKE

Alex Limbach, Carmel, N. Y.

Application August 28, 1934, Serial No. 741,764

16 Claims. (Cl. 206—56)

This invention relates to holders for cosmetics or the like, and especially to holders or containers for such articles as lipsticks, eyebrow pencils, or other cosmetics in stick form or the like.

It is the purpose of this invention to afford a holder for cosmetics or the like which has a minimum of working parts and which is of simple construction so that the holder is economical to manufacture and is light in weight.

It is a further purpose of this invention to afford a container for articles such as lipsticks or the like which is provided with a cover at the end thereof to keep the container closed when it is not desired to use the contents of the holder.

It is also the purpose of this invention to afford a holder provided with means for causing the contents of the holder to protrude therefrom and at the same time to cause the cover to be removed so that the contents may be protruded from the holder. With the device of this invention, a construction having the foregoing characteristics is provided which is capable of positive one-hand operation and in which the length of the contents of the holder, such as a lipstick, is governed only by the length of the holder.

It is a further purpose of this invention to make the holder dust- and dirt-proof when the cover thereof is closed. It is also a purpose of this invention to make a holder which is strong and "foolproof" in operation. Holders made according to this invention are of such strength that they are not injured by dropping and likewise the cover is reinforced when in closed position so that danger from injury is greatly reduced. It is also a purpose of this invention to afford a holder which is of a trim and neat appearance and which does not possess an undesirable amount of bulk.

Several new features enter into holders for cosmetics or the like embodying this invention. It may be pointed out that a holder which is operable to actuate the cover and protrude the contents thereof is secured notwithstanding the employment of a minimum of thicknesses of metal in the walls of the holder; and the number of parts required for assembly has beeen reduced to six parts, of which three alone are movable parts in the completed assembly, thereby simplifying assembly and reducing the likelihood of the device getting out of order in use. Moreover, the different parts are of a simple and easily manufactured type so that the cost of construction of the holder is greatly reduced. Thus it is an advantage according to this invention that the holder comprises an outer casing which may consist simply of a barrel open at both ends. The inner shell of the device which carries the moving parts is of simple construction and, when inserted into the outer casing, forms a bottom closure for the casing. It is likewise of advantage that the bottom closure for the inner shell or frame is integral with one of the walls thereof so that the device is of a strong and rigid character and is likewise economical of manufacture.

Further features of this invention relate to the cover mechanism which is adapted to be moved into and out of position for closing the opening in the end of the outer casing of the holder, the cover is preferably of a one-piece solid-top construction which makes the device dirt- and dust-proof when the cover is in position to close the holder. Notwithstanding the solid one-piece cover construction, there is provided according to this invention means for moving the axis of rotation of the cover during the closing thereof so that the lateral displacement of the cover during its closing movement is reduced and is substantially less than the lateral displacement of the cover if the cover were rocked about a fixed axis. This last-named feature is very desirable in the construction of a holder having a neat appearance and without a bulge near the top of ungainly appearance. In this construction, the upper portion of the casing for the holder can be made narrower even though the cover is mounted within the casing to open and close the opening in the casing. The holder with this feature of my invention can thus be made narrower with resulting increase in compactness and improvement in design. Further features of this invention relate to means for rocking the cover, which means include a pivoted lever, a gear or other mechanism interposed between the lever and the cover, and means whereby the lever is moved to open the cover upon causing the contents of the holder to be protruded therefrom. It is a feature and advantage of this invention that the means for actuating the cover are adapted to seal any opening leading to the interior of the holder so as to prevent dirt and dust from entering when the cover for the holder is closed. In a holder made according to this invention, it is also advantageous that it is impossible to push up the cosmetic article against the cover of the device when the cover is closed, thus avoiding the possibility of crushing the cosmetic article in the container.

Further features of this invention relate to the manner in which the carrier of the cosmetic article is mounted in the holder so that the tendency of the carrier to wabble in the holder is decreased.

Further purposes, features and advantages of this invention will be apparent in connection with the following description of the accompanying drawing, showing a specific embodiment of this invention suitable for holding lipsticks, for example, wherein Figure 1 is a perspective view of the holder standing upright with the upper end of the holder closed by the cover;

Figure 2 is a longitudinal view in cross-section of the holder showing the end of the holder open, the carrier in raised position and an article, such as a lipstick, protruding beyond the end of the holder;

Figure 3 is a perspective view of the inner frame used in the holder;

Figure 4 is a front view of the frame, lever, and cover showing the cover in closed position;

Figure 5 is a view similar to Fig. 4 showing the position of the parts when the cover has been partially opened;

Figure 6 is a view similar to Fig. 4 showing the cover in open position;

Figure 7 is a front view of the cover and cover pivot for the purpose of illustrating certain features of this invention;

Figure 8 is a cross-sectional plan view of the holder with the lever in the position which it occupies when the holder is closed;

Figure 9 is a view in perspective of the cover;

Figure 10 is a longitudinal view in cross-section of a modified form of holder adapted to carry a round article such as a lipstick; and Figure 11 is a detail view in perspective with a portion removed of the modified form of the carrier shown in Fig. 10.

Referring to the modification of this invention shown in Figs. 1 to 9, the holder comprises an outer casing 12 which has an opening 13 in the upper end thereof through which an article contained in the casing may be caused to protrude. In one wall of the casing, there is a slot 14 extending longitudinally thereof. Within the casing is a frame which is indicated generally by the reference character 15. The frame has three longitudinally-extending walls. Two of the walls, namely, 16 and 16', may be substantially parallel with each other and may be connected by a third wall 17. At the bottom of the frame is a base portion 18 which is preferably connected integrally to one of the longitudinally-extending walls of the frame and is shown as being integrally connected with the wall 17 of the frame. The walls 16 and 16' of the frame have rounded portions 19 and 19' as shown in Fig. 3, which rounded portions facilitate the operation of the cover employed in the holder, as will be described more in detail below. At the bottom of the rounded portions 19 and 19' are shoulders 20 and 20'. The front wall 16 may be provided with a longitudinally-extending slot 21, or (to provide a frame adapted to be assembled at will either with a square carrier or a round carrier, as hereinafter described) each of the front wall 16 and back wall 16' may be provided with longitudinally-extending slots 21 and 21'.

The frame 15 is adapted to be inserted in the casing 12 as shown in Figs. 2 and 8. When the frame is inserted in the casing, the base 18 forms not only the bottom of the frame 15 but also the bottom closure for casing 12. Preferably the base 18 projects outwardly from the bottom of wall 16 to form a step 49 serving as a spacing member to assure ample space for the free movement of the lever 37, described below, and also by fitting snugly within the opening in the bottom of the casing 12 serves the additional purpose of improving the contour of the base. To frictionally hold the frame 15 in the casing 18, suitable studs 22 may be provided on the frame and likewise the stud 23 may be provided in the casing which is adapted to enter into the hole 24 near the base of the frame so as to lock the frame within the casing when it is fully inserted. When the casing is within the frame, the slot 14 in casing 12 registers with the slot 21 in front wall 16.

Mounted within the casing 12 and on the frame 15 is the cover which is indicated generally by the reference character 25. The cover comprises a flat top piece 26, a flat side piece 27, and a second flat side piece 28 disposed oppositely with respect to side piece 27 and preferably substantially parallel thereto. The side piece 28 is provided with an elongated slot or opening 29 which is adapted to receive a pin 30 adjacent the top of wall 16 of frame 15. The position of the opening 29 and of the pin 30 is such that the cover can be rocked about the end of the frame 15 so as to be moved from position wherein the cover is across the top of the frame 15, as shown in Fig. 4 to position wherein the cover is moved to one side of the frame as shown in Fig. 6. The reason for the rounded portions 19 and 19' of walls 16 and 16' is apparent, as these rounded portions permit the cover 25 to have the rocking motion above described. Likewise, when the cover is in the position shown in Fig. 4, the top plate of the cover is permitted to rest on the ends of walls 16 and 16' so that any pressure on the cover from the outside is borne by the walls rather than the pivot pin 30. This affords a very strong construction which is resistant to injury due to impacts on the cover of the holder. Preferably the opening 29 is elongated, in the direction shown in the drawing, so that the axis of rotation of the cover may be changed during the movement of the cover from open to closed position. The extent of the length of the opening 29 is so arranged that the axis of rotation of the cover is changed during motion of the cover in such a manner that the lateral displacement of the cover during the rocking motion is substantially less than it would be if the cover were mounted to pivot about a fixed axis of rotation. This feature of my invention is brought out clearly in Figs. 4, 5, 6 and 7. In Fig. 4, the cover 25 is shown in closed position. When the cover is in closed position, the pin 30 is in one end of the opening 29 as shown. In Fig. 5, the device is shown with the cover partly opened. It is seen that the axis of rotation of the cover has been laterally shifted during the movement of the opening 29 with reference to the pin 30. In Fig. 6, the cover is shown completely open, and it is to be noted that the shifting of the axis has now moved slot 29 so that pin 30 is now positioned in the opposite end of the opening 29. With this construction, the top portion 26 of the cover comes to rest when in open position above the shoulders 20 and 20' and at no point in its movement from closed to open position does any part of the cover 25 extend laterally beyond the plane which includes the two parallel edges of the wall members 16, 16' at the left as seen in Fig. 5.

In order to better explain this operation of the cover as shown in Figs. 4, 5 and 6, attention is called to Fig. 7 which is used for purposes of contrast only. In this figure, the cover is shown in solid lines in closed position. In dotted lines, the cover is shown in opened position, but in this case the cover is shown as having been rocked without changing the axis of rotation thereof. It is pointed out that, when the axis of rotation is not shifted (as in Fig. 7), the cover in open position comes to rest at a position substantially to the left of the position shown in Fig. 6, and furthermore that during its rotation a corner of the cover passes through an arc which extends beyond the plane above referred to and so would cause this corner of the cover to interfere with the inner surface of the casing 12 which occupies that plane. This arc is indicated by a broken curved line in Fig. 7. The same arc is indicated in broken line a in Fig. 4 for purposes of comparison, and to show the extent of the interference with the casing wall. By providing means for shifting the axis of rotation during rotation of the cover, as above described, this interference is avoided as may be clearly seen in Fig. 4 wherein the arc a is that which would be the path of movement of the corner of the cover if the axis were not shifted, and arc b is that which is the path in view of the shifting of the axis. The construction shown in Figs. 4, 5 and 6 is very advantageous in making the end of the casing 12 more compact, while permitting the cover to completely disappear inside the casing 12, which is narrower at the top. Without this construction the casing 12 would have to be enlarged at the top and the device would be ungainly in appearance.

Mounted for longitudinal sliding within the frame 15 is the carrier member 32 which is adapted to hold a cosmetic article 33 or the like, such as a lipstick. To move the carrier member 32 suitable operating means are provided such as a push button or finger piece 34 connected to the carrier 32 by means of a rod or pin 35 which passes through slots 14 and 21. On a side of the carrier member 32 which is at about a 90° angle with respect to the side of the carrier member to which the finger piece 34 is attached are positioned projecting ribs 36 and 36' which are adapted to be in slidable contact with the wall 17, for example, of the frame when the pin 35 passes through the slot 21 of the frame and slot 14 of the casing. With this arrangement, the pin 35 and guide slots 14 and 21 cooperate with the projections 36 and 36' to prevent the carrier member 32 from wabbling within the frame. While the carrier member itself may be sufficiently wide to be in slidable engagement with the wall 17 of the frame, it is preferable to have the projections 36 and 36', as the sliding action of the carrier is improved by the employment of the projections. However, it is not without the scope of this invention to omit the projections 36 and 36' from the carrier member 32.

In order to further steady the action of the carrier 32, and to provide a permanent means of assembly for making the device "foolproof", the finger piece 34 may be connected to the carrier in an improved manner. This is seen in Fig. 2 of the drawing. It is also seen in Fig. 11 where the carrier is shown as circular in cross-section, but the manner of attachment of finger piece 34 is the same whether the carrier is circular or square in cross section. This improved manner of attachment is as follows: The finger piece 34 is secured upon one end of a pin 35. The other end of this pin is secured to the mid-point of a slide member 47 adapted to rest in contact with the outer surface of the carrier and longitudinally thereof. Fingers 48 and 48' at each end of slide member 47 enter holes in the carrier and are bent over within the carrier to secure the slide member 47 thereagainst. The slide member 47 is adapted to engage slot 21 in the frame 15, when the carrier is assembled within the frame, and because the slide member 47 has appreciable length it serves additionally to steady the movement of the carrier and to prevent wabble therein.

For the purpose of actuating the cover so that the cover will be open when it is desired to cause the protrusion of a cosmetic article from the holder, suitable means are provided including a lever 37 which is pivoted to the frame 15 by pivot pin 38 which optionally may be attached either to the lever 37 or to the frame 15. When attached to lever 37 it cooperates with hole 46 in wall 16 of the inner frame 15. Adjacent the opposite end of the lever are suitable means for causing a rocking motion of the cover. In the drawing, the means shown comprise a series of teeth 39 at the end of the lever and another series of teeth 39' on the side wall 26 of the cover which in effect afford gearing between the lever and the cover. The lever 37 is provided with a slot 40, part of which acts as a cam portion, as will be described below.

The lever 37 is positioned between the wall 16 of the frame and the wall of the casing which contains the slot 14. Pin 30, upon which the cover is pivoted, is of sufficient length to make contact with the wall of the outer casing (see Fig. 2) to space such wall apart from wall 16 of the inner frame 15, and thus prevent any binding of these walls upon the cover 25 or the lever 37. The pin 35 passes not only through the slot 21 in the frame and the slot 14 in the casing, but also through the slot 40 in the lever.

The operation of the cover in conjunction with the protrusion of the cosmetic article from the casing is believed to be apparent from the above description. In Fig. 4, the holder is in closed position with the cosmetic article retracted therein. The lever 37 by the action of the pin 35 in the slot 40 of the lever is held in position which keeps the cover 25 closed. Upon moving the finger piece 34 upwardly as with the thumb or finger, the pin 35, by virtue of the cam portion 41 of the slot 40, causes the lever to rock about pivot 38. This motion of the lever causes the cover 25 to rock about the pin 30 and at the same time causes the axis of rotation of the cover 25 to be moved as has been described more in detail above. Since the cam portion of the slot 40 is relatively short, the lever is moved to completely open the cover so that it occupies the position shown in Fig. 6 upon only an initial movement of the finger piece. Thus only a relatively slight movement of the cosmetic article within the casing is necessary to cause the cover to be moved out of the way so that the cosmetic article can be protruded from the casing without injury thereto. After the cover has opened, the straight portion of slot 40 becomes parallel with the slots 14 and 21 and further movement of the cover does not take place even though the cosmetic article is caused to protrude to the full extent thereof from the casing as when the parts are in the position shown in Fig. 2.

Upon retracting the cosmetic article into the casing, the reverse of the above procedure takes place. First, the cosmetic article is retracted into the casing without movement of the cover until such time as the cover can be closed without injury to the cosmetic article. Thereafter, further retraction of the article by movement of the pin 35 on the cam portion 41 of the slot 40 causes the lever 37 to be moved about its pivot so as to bring the cover into closed position. Again, the lever acts on the cover to cause its axis of rotation to be moved during the closing thereof and to bring the cover into its final position across the end of the casing with the top portion thereof resting on the end walls 16 and 16' of the frame and with the edges thereof fully closing the opening 13 in the end of casing 12.

A modification of this invention is shown in Figs. 10 and 11. In this modification the carrier member is adapted to hold a round cosmetic article, rather than a square article. The outer casing 12 is the same as the outer casing described in connection with Figs. 1 to 9. Likewise, the inner frame 15, the cover 25, and the means for actuating the cover are the same as in the modification described above in connection with Figs. 1 to 9. With regard to the carrier member for holding the cosmetic article, this member, which is indicated generally by the reference character 42, is round rather than square. The carrier member may be provided with suitable means such as a stamped out ear 43 which acts as a base against which a cosmetic article may be rested when inserted in the carrier member. To cause the cosmetic article to be retained in the carrier, one or more lugs such as lug 44, preferably inclined, may be provided. Attached to the carrier member by means of pin 35 is the finger piece 34, the same as described above in connection with Figs. 1 to 9. To cause the round carrier member 42 to slide without wabbling in the frame, the carrier member is provided with a longitudinally elongated lug or pressed out rib 45, preferably positioned on the opposite side from the finger piece 34. Such lug or rib preferably operates in a groove 21' in side wall 16' of the frame 15. It is sufficiently long to steady the carrier against wabbling or lateral displacement.

Thus, in the modified form using the round carrier, the carrier member 42 is in assembled position located within the frame 15 and in contact with side walls 16 and 16' thereof. At the points of contact, slide member 47 cooperates with slot 21 in wall 16 and rib 45 cooperates with slot 21' in wall 16'. Thus a positive support is provided for the carrier, notwithstanding its round shape, and it is guided smoothly and without wabble as it is moved up and down within the frame 15.

In manufacturing devices of the type here described, I prefer to make frames 15 with both of slots 21 and 21' in place. Such frames can then be used either for assembly with square carriers (Figs. 1 to 9) in which case the extra slot 21' is not used, or with round carriers (Figs. 10 and 11) in which case the extra slot 21' is used in cooperation with rib 45 to guide the carrier in its forward and backward movement.

By the means above described, I am able to assemble a cosmetic holder in which there are but six parts to be assembled. These are the outer casing 12, the inner frame 15, the rocking cover 25, the actuating lever 37, and the finger piece 34 with associated pin and slide which secures the whole in assembled relation. When assembled, the finger piece and associated parts become integral with the carrier, so that when the device comes into the hands of the user the only moving parts are three—the carrier with its finger piece, the cover, and the actuating lever. Because of the simplification thus attained, the chances of the device getting out of order are greatly decreased; and the small number of parts to be handled in assembly makes the device easy and inexpensive to assemble.

To assemble the device the rocking cover 25 is first placed in position on the top of the inner frame 25 with its elongated slot 29 in registry with the pin 30. The lever 37 is then placed in position with its pin 38 in the hole 46 and its gear teeth 39 in engagement with the gear teeth 39' of the cover 25. Square carrier 32, or round carrier 42, is then inserted within the frame 15 in proper position, and the whole is introduced into the lower end of casing 12. The parts are then moved till slots 14, 40 and 21 are in alinement, and the carrier is near the upper end of its path of travel. The finger piece 34, with integral pin 35, slide member 47 and fingers 48, 48' is then inserted through these slots till the fingers protrude through the holes in the carrier, and these fingers 48, 48' are thereupon bent over within the carrier by any suitable tool, working through the open upper end of the device. Assembly is now complete. Upon insertion of the cosmetic material into the carrier, the device is ready for use.

While this invention has been described in connection with certain specific embodiments thereof which have been illustrated in the drawing, it is to be understood that this has been done merely for the purpose of illustrating the invention and that the features forming parts of this invention may be embodied in other holders for cosmetics or the like without departing from the scope of this invention. Accordingly, this invention is to be limited only to the language of the following claims.

I claim:

1. A holder for cosmetics or the like which comprises a casing having an opening in the end thereof, a member longitudinally movable in said casing, operating means for moving said member longitudinally in said casing, a cover adapted to be rocked within said casing into and away from position across said opening in said casing, means affording a change of axis of rotation of said cover during the rocking movement thereof, a lever having a fixed pivot, means responsive to movement of said operating means for moving said lever about its pivot, and means interposed between said lever and said cover for moving said cover into and away from position across said opening in said casing upon longitudinally moving said member in said casing.

2. A holder for cosmetics or the like which comprises a casing having an opening at an end thereof, a carrier member longitudinally slidable in said casing, operating means for moving said carrier member longitudinally in said casing, a cover mounted pivotally within said casing which is adapted to be moved within said casing into and away from position across said opening, means affording a change of axis of rotation of said cover during the movement thereof, a lever longitudinally disposed within said casing and pivotally mounted adjacent the end thereof removed from said cover, means cooperating between the other end of said lever and said cover for moving said cover into and away from position across said opening when said lever is moved about its pivot, and means on said lever between its pivot and the other end of said lever and responsive to movement of said operating means for moving said lever about its pivot to move said cover into and away from position across said opening when said member is moved by said operating means longitudinally in said casing.

3. A holder for cosmetics or the like which comprises a casing having an opening at an end thereof, a stationary frame within said casing, a longitudinally slidable carrier within said frame, operating means extending through said casing and said frame for longitudinally sliding said carrier in said frame, a pivoted cover at the end of said frame adapted to move within said casing into and out of position across the opening of said casing, a pivoted lever adapted to be actuated by said operating means, and means interposed between said cover and said lever for moving said cover into and out of position across said opening in said casing upon actuation of said lever by said operating means.

4. A holder for cosmetics or the like which comprises a frame having a flat side wall and a longitudinally extending slot in said side wall, a cover pivoted to rock about an end of said frame, a lever pivoted on said wall of said frame at a point substantially removed from said cover, means responsive to movement of said lever about its pivot for rocking said cover, a slot in said lever, a member longitudinally slidable in said frame, and operating means carried by said member and extending through said slot in said wall and said slot in said lever, said slots being disposed in said wall and said lever so that an initial movement of said operating means will actuate said lever relatively to said wall to rock said cover between open and closed positions thereof at the end of said frame.

5. A holder for cosmetics or the like which comprises a frame having a wall disposed substantially in a plane and a longitudinally extending slot in said wall, a carrier member longitudinally slidable within said frame, a cover pivotally mounted adjacent an end of said frame which is adapted to be moved to and from position which obstructs the end of said frame about an axis substantially perpendicular to the plane of said wall, a lever pivotally mounted in said frame at a point substantially removed from said cover so as to be movable in a plane substantially parallel to the plane of said wall, operating means carried by said carrier member extending through said slot, gear means between said lever and said cover for actuating said cover upon movement of said lever, and means responsive to said operating means for moving said lever to actuate said cover when said carrier member is moved longitudinally in said frame.

6. A holder for cosmetics or the like which comprises a casing having an opening in the end thereof, a cover mounted within said casing for rocking movement into and away from position across the said end of said casing, means for actuating said cover, and means affording a change of the axis of rotation of said cover during the rocking movement thereof.

7. A holder for cosmetics or the like which comprises an elongated casing having an opening in the end thereof, a frame within said casing, a cover adapted to be rocked about an end of said frame and within said casing for covering and uncovering the said opening in said casing, means for rocking said cover and means for changing the axis of rotation of said cover during the rocking movement thereof so that the lateral displacement of said cover during the rocking movement thereof is substantially less than the lateral displacement thereof about a fixed axis of rotation.

8. A holder for cosmetics or the like which comprises an elongated casing having an opening in the end thereof, a frame within said casing having substantially parallel walls, a cover adapted to be rocked about an end of said frame within said casing for covering and uncovering the said opening in said casing, said cover having a member parallel to said walls of said frame, a pin in a wall of said frame to act as a pivot for said cover, a slot in said member affording change of axis of rotation of said cover about said pivot so as to reduce the lateral displacement of said cover during the rocking thereof about said pivot, a pivoted lever, gear means interposed between said lever and said cover, a carrier member longitudinally movable in said frame and means for actuating said lever to rock said cover when said carrier member is longitudinally moved in said frame.

9. A holder for cosmetics or the like which comprises a rectangular elongated casing having an opening at an end thereof, a stationary frame within said casing having three walls substantially parallel to the walls of said casing, a cover pivoted adjacent one end of said frame and adapted to move within said casing into and out of position across said opening in said casing, a lever between a wall of said casing and a wall of said frame and parallel thereto that is pivoted adjacent one end thereof, means interposed between the other end of said lever and said cover for moving said cover, and longitudinally movable means passing through said casing for actuating said lever to move said cover.

10. A holder for cosmetics or the like which comprises an elongated casing having an opening at an end thereof, a frame within said casing having a pair of substantially parallel walls, a cover mounted adjacent an end of said frame and having a single laterally extending top adapted to be moved into and out of position for closing said opening in said casing by a rocking motion about an axis perpendicular to the said walls of said frame, and means hinged to said frame for rocking said cover, said top being adapted to rest on portions of substantial length of the ends of said pair of walls when said cover is in closed position and corresponding corners of the ends of said walls of said frame adjacent said cover being rounded so that said cover can be rocked out of the way within said casing.

11. A holder for cosmetics or the like which comprises an elongated casing having an opening at an end thereof, a frame within said casing having a pair of substantially parallel walls, a lever between one of said walls and a wall of said casing, a cover having a laterally extending top and pair of members substantially parallel to said walls, one of which members is pivotally mounted with respect to one of said walls of said frame and said cover being adapted to rock about an end of said frame within said casing so as to be moved into and out of position across said opening of said casing, means interposed between said lever and one of said members for rocking said cover, and means operable through a slot in said casing for actuating said lever to rock said cover.

12. A holder for cosmetics or the like which comprises an elongated frame including a wall having an elongated slot therein, a cover pivotally mounted adjacent an end of said frame, a lever pivotally mounted on said wall having said slot at a point which is substantially removed from said cover and which is positioned laterally of the axis of said slot, said lever having a slot diagonally thereof with a cam portion therein, means interposed between said lever and said cover for actuating said cover upon moving said lever about its pivot, and a pin passing through said slot in said wall and said slot in said lever, longitudinal movement of said pin in said slot through a minor portion of the length thereof being adapted to actuate said lever to move said cover about its pivot substantially between the normal limits of movement of said cover.

13. A holder for cosmetics or the like which comprises a rectangular elongated casing having a side wall with an elongated slot therein, a frame within said casing having only three walls, said walls being parallel with walls of said casing and fitting snugly there within and one of two parallel walls of said frame having an elongated slot therein, a carrier member slidably mounted for longitudinal movement within said frame, a cover having a laterally extending top and two members integral with said top and parallel with said parallel walls of said frame, one of said members being pivotally mounted on a pivot presented by one of said walls so that the top of said cover is adapted to be rocked through approximately 90°, a lever between said wall of said frame having said slot and said wall of said casing having said slot, said lever having an elongated slot therein and being pivotally mounted in said frame, a pin carried by said carrier and passing through the slots in said wall of said frame, in said wall of said casing and in said lever, and cooperating teeth between said lever and one of said members forming part of said cover, said slots being disposed so that movement of said pin to longitudinally move said carrier actuates said lever to rock said cover.

14. A holder for cosmetics or the like which comprises a casing having an opening in an end thereof and having a wall with an elongated slot therein, a frame within said casing having a cover pivotally mounted adjacent an end thereof and adapted to be moved into and out of position across said opening, a lever in said casing adapted to actuate said cover, said lever having an elongated slot therein, a pin passing through said slot in said casing and said slot in said lever, said slots being disposed and said lever being mounted so that longitudinal movement of said pin in said slots actuates said lever to move said cover, and said slot in said lever and said slot in said wall being out of registration with respect to each other when said lever is in the position which it occupies when said cover is across said opening in the end of said casing.

15. A holder for cosmetics or the like which comprises an elongated frame having a wall with an elongated slot therein, a cover pivotally mounted adjacent an end of said frame, said cover having a single laterally extending top portion and being adapted to rock into and out of position where said top is approximately at right angles to the longitudinal axis of said frame, a lever pivotally mounted in juxtaposition with respect to said wall of said frame having said slot, said lever having an elongated slot therein, means interposed between said lever and said cover to rock said cover upon actuation of said lever, a pin passing through said slot in said wall and said slot in said lever, said slots being disposed and said lever being mounted so that longitudinal movement of said pin in said slots actuates said lever to rock said cover, and said slots being in registration with each other throughout the major portion of the length thereof when said cover is in position with the top thereof at approximately right angles to the longitudinal axis of said frame.

16. A holder for cosmetics or the like which comprises an elongated frame having a pair of substantially parallel walls, a cover having a laterally extending top portion and two members paralleling the said parallel walls of said frame, a pin and slot interposed between one of said walls and one of said members adapted to pivotally mount said cover for rocking about an end of said frame, teeth at the periphery of one of said members, and a part having teeth cooperating with said teeth on said member, said part being actuable to rock said cover, and said slot having approximately the same directional extent as said teeth in said member so that actuation of said cover by said part causes the axis of rotation of said cover to change laterally with respect to said frame upon rocking said cover by actuation of said part.

ALEX LIMBACH.